UNITED STATES PATENT OFFICE.

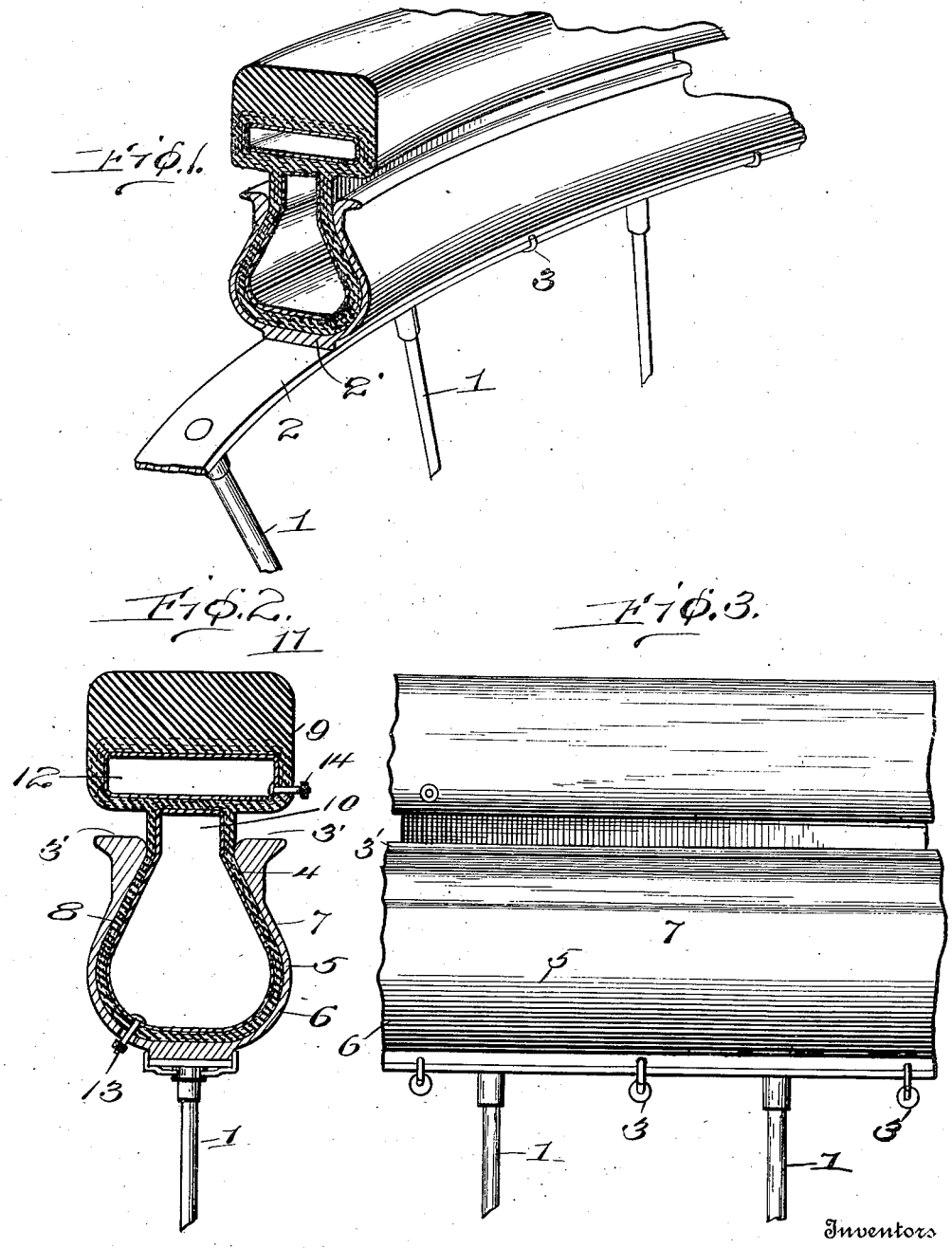

WILLIAM G. CHIPLEY, OF NEW ORLEANS, LOUISIANA.

TIRE.

1,041,739.　　　　Specification of Letters Patent.　　Patented Oct. 22, 1912.

Application filed April 10, 1911. Serial No. 620,037.

*To all whom it may concern:*

Be it known that I, WILLIAM G. CHIPLEY, a citizen of the United States, residing at New Orleans, in the parish of Orleans and State of Louisiana, have invented certain new and useful Improvements in Tires; and I do hereby declare the following to be a full, clear, and exact description of the invention, such as will enable others skilled in the art to which it appertains to make and use the same.

This invention relates to improvements in tires and means for securing the same in place, and has for an object the provision of an improved structure of tire and improved means co-acting therewith for holding the tire in place on a wheel.

Another object of the invention is the arrangement of an improved demountable rim structure for wheels having a groove or hollowed out portion for accommodating a projecting or retaining member extending from the tire.

A still further object of the invention is the arrangement of a demountable rim formed with a hollowed out portion extending entirely around the rim and arranged with inclined sides for accommodating an expansible member extending from the tire, which expansible member is designed to engage the sides of the demountable rim and the top of the demountable rim is arranged to support the body of the tire when extreme pressure is brought to bear thereon.

With these and other objects in view the invention comprises certain novel constructions, combinations, and arrangement of parts as will be hereinafter more fully described and claimed.

In the accompanying drawings: Figure 1 is a fragmentary perspective view of an embodiment of the invention. Fig. 2 is a cross section through an embodiment of the invention. Fig. 3 is a fragmentary side view of the structure shown in Fig. 2.

In constructing a device embodying the invention an improved demountable rim is provided which is held on the rim of a wheel by any desired clamping means so as to be held rigidly against movement independent of the wheel. The demountable rim is formed with a grooved opening having inclined sides which extend entirely around the rim and merge into the upper surface thereof. This grooved opening is adapted to receive a deflatable member rigidly secured to or formed as part of a tire of any desired kind, either pneumatic, solid rubber or any other kind as preferred. In placing the tire upon the rim the pneumatic member is deflated and placed in position and then inflated which will cause the same to press against the sides of the rim and firmly hold the tire in place without the use of additional securing means, whereby the tire may be quickly removed or applied. The opening at the top of the demountable rim is of substantial size and is designed to accommodate a neck structure which connects the inflatable portion of the tire with the body or tread portion so as to space the body or tread portion above the upper edge of the demountable rim.

In order that the invention may be more clearly understood an embodiment of the same is shown in the accompanying drawings in which—

1 indicates the spokes of a wheel, and 2 the rim or felly thereof. The felly 2 may be made from metal, wood, or other desired material, that shown being made of metal. Arranged to fit on top of felly 2 is a demountable rim 2' which is held in place by a plurality of clamping members 3 which firmly clamp the demountable rim to the rim or felly 2. The demountable rim 2' is formed with a bearing portion 3' for supporting the body portion of the tire when the same has unusual pressure applied thereto. The bearing portion 3' merges into a throat or neck opening 4 which throat or neck opening in turn merges into the groove 5 which accommodates the inflatable portion 6 of the tire. The groove 5 is formed with inclined sides 7 and 8 against which the sides of the inflatable portion 6 press for firmly holding the tread or body portion 9 of the tire in place. A neck portion 10 is provided which connects body portion 9 with inflatable portion 6, and which extends through neck opening 4 of the demountable rim and normally supports body portion 9 above the demountable rim. When any extreme pressure is brought to bear on the body portion the same is forced against the bearing portion 3' of the demountable rim, but as soon as the extra pressure is removed the body portion will resume its normal position spaced from the demountable rim. In this way the resilient effect of the inflatable portion 6 as well as the neck portion 10 is utilized. Body portion 9 may be formed of solid rubber or other material, but preferably is made as shown in the drawings, and said portion 9 is of greater diameter than the neck 10 to seat upon the bearing portion 3'. In this form of tire the body portion 9 is formed with a tread portion 11 constructed of an appreciable amount of rubber. The rubber if desired may have any desired number of layers of canvas passing therethrough for assisting in preventing any puncture of the inflatable portion 12. Inflatable portion 6 is provided with a valve structure 13 which passes through a suitable aperture in the demountable rim 2' so that the tire may be easily applied and removed. When applying the tire the retaining member or inflatable portion 6 is deflated and passed through neck opening 4 into its proper place, and then air is forced into the same until a sufficient pressure has been attained. This will effectually prevent any removal, or in fact, any shifting of the tire. Inflatable portion 12 is provided with air through valve 14 which valve, of course, may be placed at any desired point.

What I claim is:

In a device of the character described, the combination with a rim formed with an annular groove substantially pear shaped in cross-section merging into a concave outer surface, of a tire structure formed of a tire portion, an inflatable portion and a valve for said inflatable portion, said inflatable portion being formed with a body portion and a neck portion, the body portion fitting said annular groove in said rim, and said neck portion supporting said tire portion normally above the concave outer surface of said rim, whereby the resilient effect of the inflatable portion is utilized for resiliently supporting said rim.

In testimony whereof I affix my signature in presence of two witnesses.

WILLIAM G. CHIPLEY.

Witnesses:
 ROBT. T. LANG,
 NANNIE MEEM.